United States Patent [19]
Rouet et al.

[11] Patent Number: 5,883,638
[45] Date of Patent: Mar. 16, 1999

[54] METHOD AND APPARATUS FOR CREATING LIFELIKE DIGITAL REPRESENTATIONS OF COMPUTER ANIMATED OBJECTS BY PROVIDING CORRECTIVE ENVELOPING

[75] Inventors: Christian Rouet, San Rafael; John Lewis, Paloi Alto, both of Calif.

[73] Assignee: Lucas Digital, Ltd., San Rafael, Calif.

[21] Appl. No.: 565,898

[22] Filed: Dec. 1, 1995

[51] Int. Cl.[6] ................................................. G00T 15/70
[52] U.S. Cl. ............................................................ 345/473
[58] Field of Search .................................... 395/173, 174, 395/175

[56] References Cited

U.S. PATENT DOCUMENTS

| | | | |
|---|---|---|---|
| 4,600,919 | 7/1986 | Stern ........................................ | 395/175 |
| 5,267,154 | 11/1993 | Takeuchi et al. ........................ | 395/173 |
| 5,416,899 | 5/1995 | Poggio et al. ........................... | 395/175 |
| 5,457,755 | 10/1995 | Ishida et al. ............................. | 382/324 |
| 5,594,856 | 1/1997 | Girard ..................................... | 395/173 |

OTHER PUBLICATIONS

Litwinowicz et al., "Animating Images with Drawings," Computer Graphics Proc., Annual Conference Series, pp. 409–412, Dec. 1994.
Ruprecht et al., "Free Form Deformation with Scattered Data Interpolation Methods," Computing Suppl. 8, pp. 267–281, Dec. 1993.
Perlin, "Real Time Responsive Animation with Personality," IEEE Transactions on visualization and Computer Graphics, vol. 1, No. 1, pp. 5–15, Mar. 1995.
Foley et al., Computer Graphics: Principles and Practice, Addison–Wesley Publishing Company, pp. 471–473, 1990.
Badler et al., Articulated Figure Positioning by Multiple Constraints, IEEE CG&A, pp. 28–38, Jun. 1987.
Zelter, Motor Control Techniques for Figure Animation, IEEE CG&A, pp. 53–59, Nov. 1982.
Wayne Earl Carlson, "Techniques for the Generation of Three–Dimensional Data for Use in Complex Image Synthesis," Ph.D. disseration, The Ohio State University, 1982.
Nadia Mangenat–Thalmann & Daniel Thalmann, "The direction of Synthetic Actors in the Film *Rendez–vous á Montréal,*" IEEE Computer Graphics & Applications, Dec. 1987, pp. 9–19.
Koji Komatsu, "Human skin model capable of natural shape variation," The Visual Computer, vol. 3, No. 5, 1988, pp. 265–271.
Nadia Mangenat–Thalmann, Richard Lapperriére & Daniel Thalmann, "Joint–Dependent Local Deformations for Hand Animation and Object Grasping," Proceedings, Graphics Interface '88, pp. 26–33.

*Primary Examiner*—Rudolph J. Buchel, Jr.
*Attorney, Agent, or Firm*—Irell & Manella LLP

[57] ABSTRACT

Methods and apparatus are disclosed for automatically generating features of computer animated objects that are represented by a skeleton surrounded by an envelope. An animator may modify the shape of the envelope for a particular configuration of the object's skeleton ("pose"). These envelope modifications for these poses are stored. When an animator desires to create a new pose, the stored modifications for previous poses are blended together, based upon the difference between each pose and the new pose, to automatically generate a modified envelope shape for the new pose. When satisfied with a particular envelope shape for a pose, the animator may store the modification in the database and the modification may then be used for subsequent poses.

8 Claims, 4 Drawing Sheets

FIG. 7
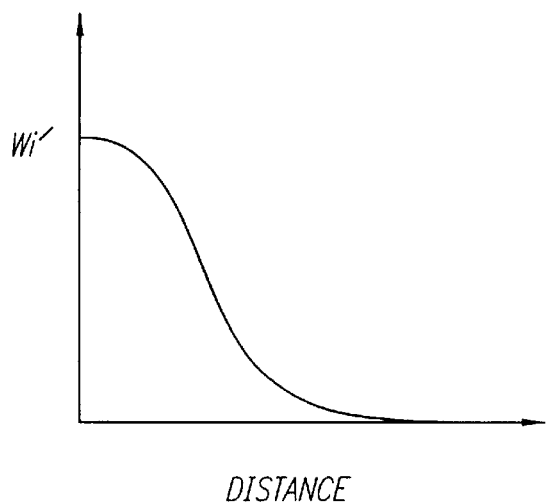
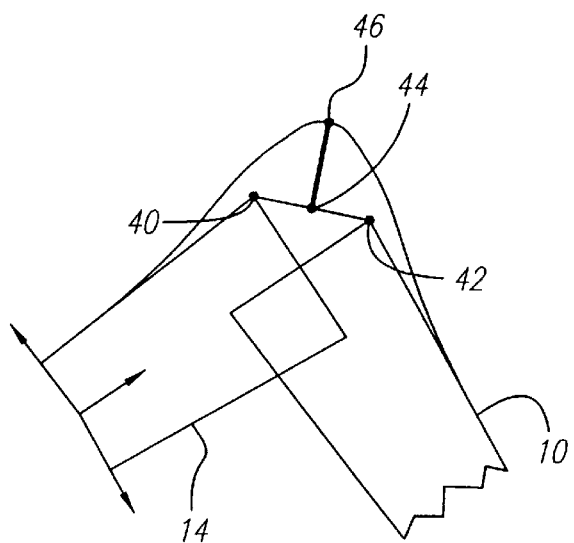
FIG. 8a
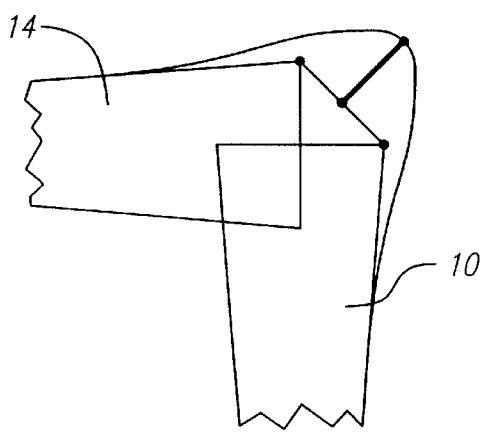
FIG. 8b

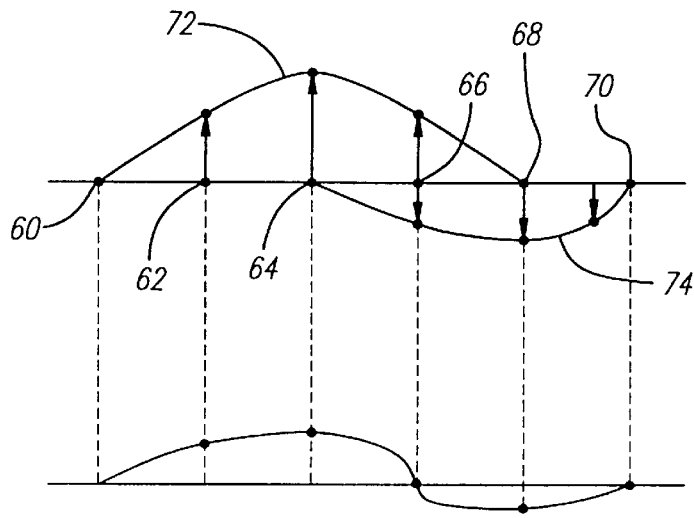
FIG. 9a
FIG. 9b
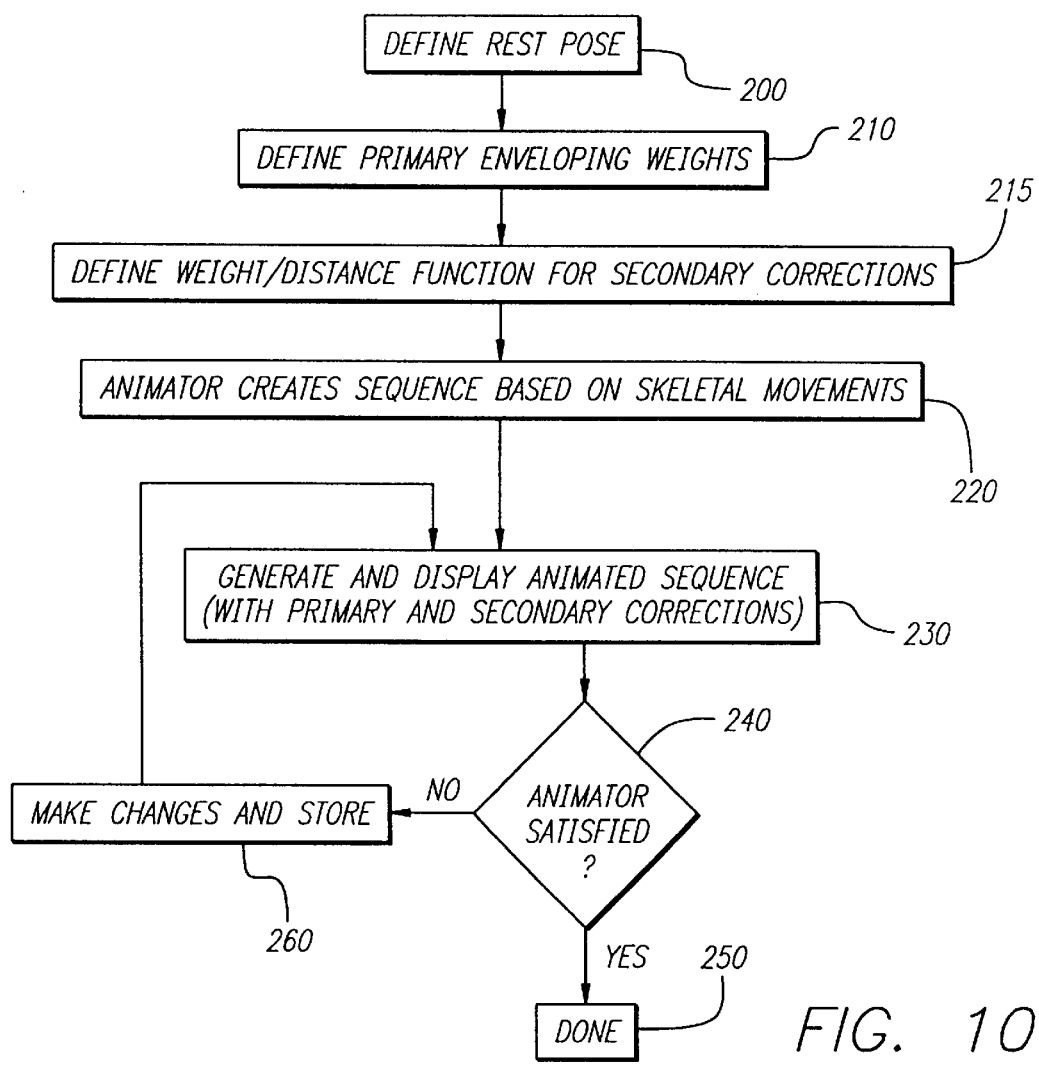
FIG. 10

METHOD AND APPARATUS FOR CREATING LIFELIKE DIGITAL REPRESENTATIONS OF COMPUTER ANIMATED OBJECTS BY PROVIDING CORRECTIVE ENVELOPING

FIELD OF THE INVENTION

The present invention relates to computer graphics techniques for creating lifelike digital representations of computer animated objects.

BACKGROUND OF THE INVENTION

The computer animation of an object whose characteristics change through time has proven an exceedingly difficult problem to solve. A common technique for digitally representing an object is to define a "skeleton" for the object and to surround the skeleton with an envelope that represents the actual shape of the object. See FIG. 1. Current animation software allows an animator to move the object by selecting a segment on the skeleton and moving the segment. For example, by clicking, with a mouse, on a forearm skeletal section 10 of an object 12 shown in FIG. 1 and moving a cursor, the entire segment moves according to the desired motion, which is shown in the FIG. 2a as a rotation. In this manner, an animator may efficiently create moving sequences of an object.

The procedure just described presents difficulties for the modeling of the actual shape of the object as opposed to its skeleton. The outer surface of the object may stretch, shrink or otherwise transform in a manner that cannot be completely accounted for in the movement of the skeleton. Prior art techniques provide imperfect corrections to the transformation of the envelope.

FIG. 2a illustrates an example of a problem caused by the rotation operation illustrated in FIG. 1. The envelope of each part of an object is defined with reference to a specific segment of the skeleton. For example, an envelope 16 of the forearm 10 may be defined as a set of points which lie at a predetermined distance from the forearm segment 10 while an envelope 18 of the bicep may be defined as a set of points which lie at a predetermined distance from the upper arm segment 14. When the forearm segment 10 is rotated, the forearm envelope 16 rotates along with the forearm 10 to create the shape illustrated in FIG. 2a, which does not account for the stretching and shrinking respectively of the bottom and top of the envelope 16. To solve this problem, those parts of the envelope that correspond to a skeletal segment and that are influenced by another segment(s) are moved as a weighted function of the influences. For example, a point 20 near the elbow illustrated in FIG. 2a may move 80% according to the movement of the forearm 10 and 20% according to the movement of the upper arm 14 while points 22 and 24 exactly at the joint may move 50% according to the movement of both the forearm 10 and the upper arm 14. In this manner, as illustrated in FIG. 2b, the envelope surrounding a joint may be transformed so that there are no overlaps or breaks in an object's envelope.

The technique outlined above, however, provides only a first order correction of the envelope. Second order corrections (or "secondary corrections"), beyond the overlapping and tearing described above, cannot at present be generated without some assistance from an animator. For example, if the skin at the elbow of the object shown in FIG. 2a has wrinkles, the wrinkles may transform in a very complicated fashion as the elbow bends. Present animation software does not provide the ability to model such sophisticated transformations. Further, many transformations may require a detailed analysis of the properties of the modelled objected. Continuing with the example of FIGS. 1, 2a and 2b, a human may rotate his or her forearm and the amount of bicep flex may depend on factors such as muscle tension other than the simple rotation. It will be appreciated that there are limitless examples of envelope transformations that cannot be modelled simply by knowledge of the movement of an underlying skeleton.

Thus, according to current techniques, each time the skeletal movement process results in a form of the object corresponding to a particular positioning of the skeletal segments (hereinafter "pose") that does not accord with the desired shape of the object for that pose, animators must make these corrections by hand, which is a tedious and time consuming process. Even where an animator has previously obtained the desired shape for similar or identical poses, the animator must manually make the same corrections that had previously been made.

There is thus a need to assist animators in the process of correcting the envelope that corresponds to a particular pose. In particular, there is a need to eliminate the time consuming and expensive process of manually correcting the envelope of an object each time the primary enveloping correction for a pose does not result in the desired envelope.

SUMMARY OF THE INVENTION

The present invention provides methods and apparatus for creating lifelike digital representations of three-dimensional objects. Steps and means are described by which secondary corrections that were previously entered for particular poses are used to automatically generate secondary corrections for new poses. The automatic generation of secondary corrections greatly decreases the amount of time required to animate certain types of objects.

More specifically, according to the present invention, an animator defines a rest pose for an object defined by a skeleton. The animator also defines an influence function that determines the extent to which secondary corrections for other poses will be used to generate a secondary correction for a new pose. When the animator moves the skeleton to create a new pose, graphics software scans the database and the difference between a stored pose and the new pose is computed according to the "distance" between the poses in "pose space."

The difference between a stored pose and a new pose is then used to generate a weight that will determine how much the secondary corrections for the stored pose affect the new pose. A weight is generated for at least one stored pose and the secondary corrections for part or all of the stored poses are added together according to their respective weights, and the secondary correction for the new pose corresponds to this weighted sum. Stated differently, the automatically generated secondary correction for the new pose is a blended sum of the secondary corrections for stored poses, with the blending for a particular pose depending on the closeness of that pose to the new pose.

After the computer has automatically generated the secondary corrections for the new pose, the animator may further alter the secondary corrections. In the preferred embodiment, once an animator has created a satisfactory secondary correction for a particular pose, the secondary correction and the pose are stored in a database according to the methods hereinafter described. These secondary corrections are then used, as previously described, to automatically generate new secondary corrections.

BRIEF DESCRIPTION OF THE DRAWINGS

FIG. 2b illustrates a primary correction of the configuration illustrated in FIG. 2a.

FIG. 7 is an example of a graph of the influence for a particular pose based upon its distance in pose space from a new pose.

FIG. 8a is an exploded illustration of part of the object illustrated in FIG. 2a. FIG. 8b shows the part of the object illustrated in FIG. 8a in a different pose.

FIG. 9a illustrates the rest position of an envelope for a particular skeletal segment and two second order corrections created for previous poses. FIG. 9b illustrates the weighting and adding of the corrections illustrated in FIG. 9a.

FIG. 10 is a flow diagram illustrating a preferred methodology in accordance with the present invention.

DETAILED DESCRIPTION OF THE INVENTION

Basic Architecture

Figure 3:
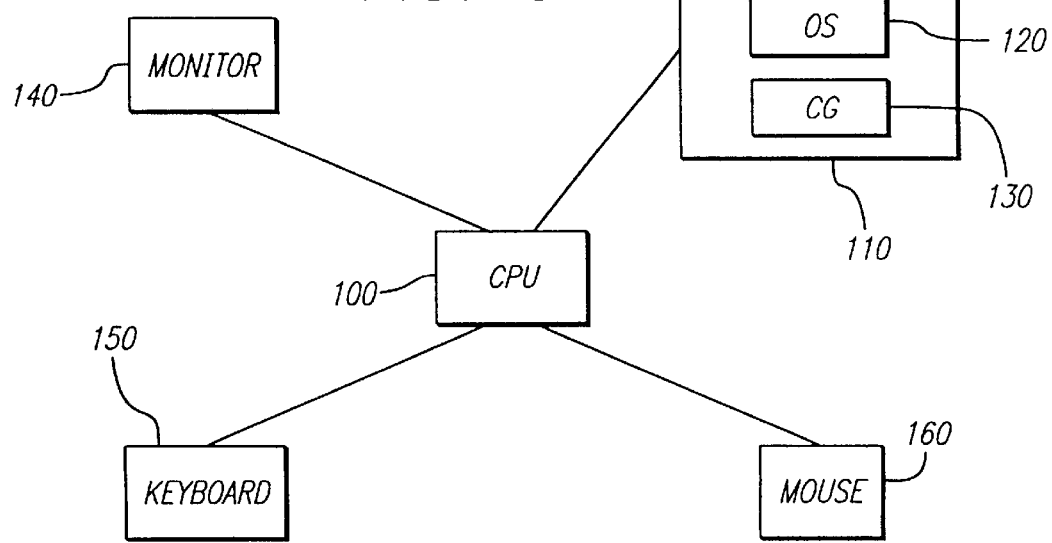
FIG. 3 provides a general illustration of preferred computer apparatus for implementing the present invention.

FIG. 3 depicts the general architecture of a digital computer system for implementing the present invention. Processor 100 is a standard digital computer processor, preferably a workstation-class processor such as Silicon Graphics Indigo2-Extreme for interactive work, or Silicon Graphics Challenge Servers for batch processing, running preferably the IRIX5.3 operating system. System software 120 is stored on storage unit 110, e.g., a standard internal fixed disk drive. Also preferably stored on storage unit 110 is computer graphics ("CG") software 130 which, in accordance with the present invention, performs the tasks of modelling as described in greater detail below. Interactive user input, where referenced below, is provided via standard input peripherals such as keyboard 150 and/or mouse 160. Graphical output created by processor 100 under control of CG software 130 is transmitted to video monitor 140 for display to users; equivalently, output may also be transmitted to a printing devices to generate hard copy output in the form of videotape, film, slides, or the like.

Methodology

Figure 1:
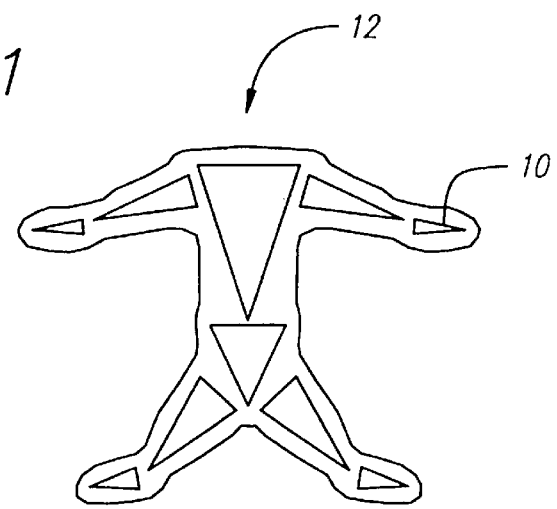
FIG. 1 illustrates an animated object defined by a skeleton surrounded by an envelope.
Figure 2A:
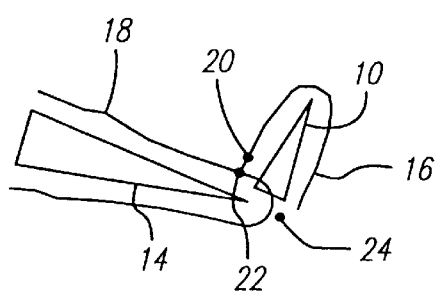
FIG. 2a illustrates the movement of part of the skeleton and corresponding envelope of the object illustrated in FIG. 1.
Figure 2B:
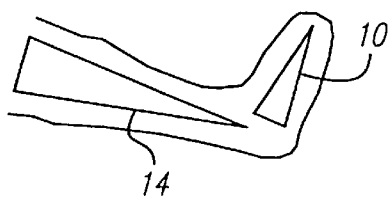

As previously described, FIGS. 1, 2a and 2b illustrate an object modelled as a three dimensional skeleton surrounded by an envelope, which, in the preferred embodiment, comprises bicubic patches that represent the actual shape of the object. The modelling illustrated in FIGS. 1, 2a and 2b may be accomplished with commercial graphics packages such as Softimage®.

In conventional computer driven key frame animation, an animator has an object model such as that illustrated in FIG. 1 for a key frame. To derive the next key frame, the animator moves the skeleton as desired and, as previously mentioned, existing computer software packages will transform the envelope as illustrated in FIG. 2b. The computer software automatically generates the inbetween frames to derive a complete animated sequence.

According to the prior art, each time the animator moves the skeleton to derive a new key frame, the animator must manually alter the object's envelope in the new key frame if corrections beyond the primary corrections are desired. As previously discussed, the animator will very frequently want to make such changes to capture the limitless variety of complex object shapes (e.g. wrinkles, bulges, indentations) that may result from a particular motion. Once the animator makes the corrections to the new key frame, the in between frames may be generated automatically. However, for the next key frame, the animator must once again make the second order corrections from scratch. Having to make second order corrections each time a new key frame is derived is a very time consuming process.

The present invention minimizes the amount of second order corrections that must be made for new key frames by automatically generating such corrections by estimating the correction based upon previous second order corrections that were made. After the second order correction is automatically generated, the animator may further modify the second order corrections. Once the animator is satisfied with the second order corrections for the pose, those corrections are stored by the computer.

Thus, the computer accumulates a database of second order corrections that correspond to particular poses and, upon the creation of a new key frame, the information in the database is used to estimate the second order corrections for the pose in the new key frame. As the number of poses and corresponding second order corrections entered into the database increases, the accuracy of the estimations also increases.

To describe the invention in more detail, the concept of pose space will first be discussed. Next, the estimation of a second order correction based upon previously entered corrections for poses will be discussed.

Pose Space

Figure 4:
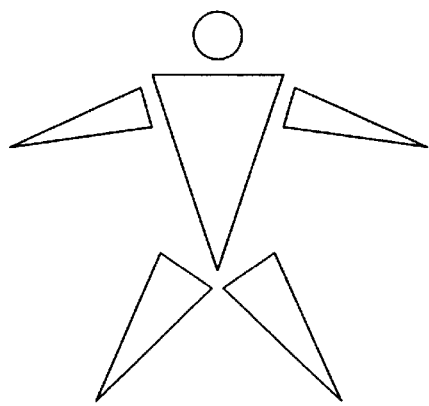
FIG. 4 illustrates a rest pose for a bipedal object.

Each combination of the three dimensional orientation of the skeletal segments corresponds to a different pose. Put differently, as in the ordinary definition of the word "pose," each pose represents a different configuration of the skeleton. It will be convenient to define a rest pose as a baseline for other poses. A rest pose for a bipedal object is illustrated in FIG. 4 but it will be appreciated that a rest pose may be defined for any type of object that may be represented by a skeleton. Each of the skeletal segments has three degrees of freedom corresponding to a rotation about a segment's own axis, and the two angles that uniquely define a point in a three dimensional coordinate system for a given distance, in this case the length of the segment, from an origin. Thus, for a skeleton with N segments, there are a total of 3(N−1) degrees of freedom (dimensions) for the skeleton. A specified value for each of these dimensions defines a particular pose.

For purposes of illustration, a simplified pose space will be shown. FIGS. 5a–5d show different poses for the two skeletal segments 10 and 14 where segment 14 can rotate about its own axis and segment 10 can rotate about the y axis. It is assumed that no other motions are possible and therefore the pose space is two dimensional, the dimensions comprising the angle about segment 14's own axis and the angle of segment 10 from the z axis. Although the FIGS. 5a–5d appear as a sequence, the different poses illustrated in the FIGS. 5a–5d may actually have occurred in completely different scenes of the animation or even a completely separate animated production.

Figure 5A:
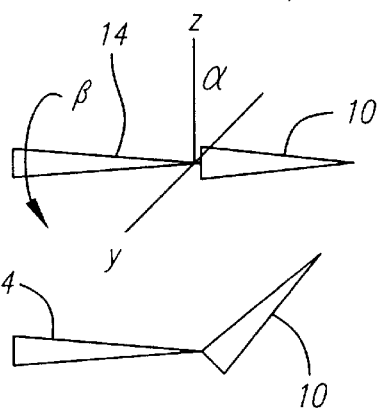
FIGS. 5a–5d show different poses for two skeletal segments where segment can rotate about its own axis and segment can rotate about the y axis.
Figure 5B:
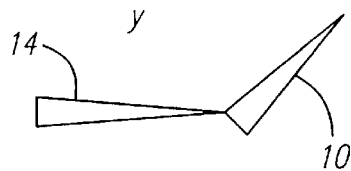
Figure 5C:
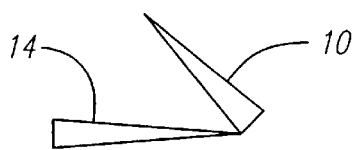
Figure 5D:
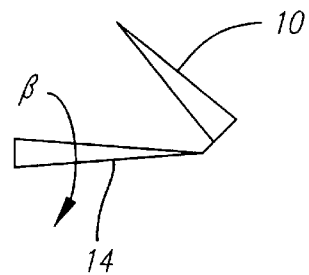
Figure 6:
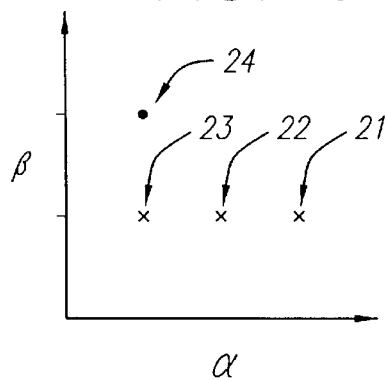
FIG. 6 is a graph of the four poses illustrated in FIGS. 5a–5d.

FIG. 6 is a graph of the four poses illustrated in FIGS. 5a–5d. The pose in FIG. 5a is represented by the point indicated by the number 21 in FIG. 6, the pose of FIG. 5b is represented by the point indicated by the number 22, the pose of FIG. 5c by number 23 and the pose of FIG. 5d by the number 24. In poses 21–23, segment 10 has been rotated about the y axis while segment 14 has not changed. Pose 24 represents segment 10 in the same position it has in pose 23 while segment 14 has rotated about its own axis compared to pose 23. The graph illustrated in FIG. 6 reflects only two dimensions, whereas, as previously described, the pose space is actually (N−1)*3 dimensional where N is the number of segments. Constraints on particular segments may decrease the number of dimensions in the pose space.

For a particular pose, when an animator is satisfied with the second order corrections, that may be derived automatically as described herein, manually, or a combination of the two, the animator simply presses a key and the corrections are automatically saved for that pose. A database stores the pose space point and the second order corrections for that pose, as will be more fully described below.

Automatic Generation of Second Order Corrections

Once a new pose is derived, computer software 130 generates an automatic second order correction based upon the previously entered second order correction for other poses. An animator may choose to further modify the automatically generated correction but the amount of such modifications will almost always be smaller than if the second order correction were not automatically generated according to the methods described herein.

Returning to the example illustrated in FIGS. 5a–5d and FIG. 6, it is assumed that an animator moves the segments such that a pose is struck that is intermediate between the poses illustrated in FIGS. 5a–5d. This new pose is indicated by the "x" in FIG. 6. The second order correction made to the new pose is a weighted sum, with the weights ranging from 0% influence to 100% influence, of the second order corrections for each of the poses 21, 22, 23 and 24. The amount of the weighting for a particular stored pose depends on the distance, in pose space, between the desired pose point and the particular stored pose. Distance in this case means simple euclidean distance, even though the dimensions are angles. The distance formula is:

$$\sqrt{\Sigma_i^2 (P_i - P_{ci})^2}$$

where P represents the desired pose and $P_c$ represents a particular stored pose.

The distances between each previous pose and the new pose is then used to weight the influence the previous pose has on the correction. The animator may define the weights based upon distance. FIG. 7 is an example of a graph of weighting versus distance; generally, the closer the previous pose is to the new pose, the greater the influence that it will have.

The derived weights are then used to determine the corrections. In the preferred embodiment, the corrections are made to control points that define bicubic patches. The following describes in detail the process of making such corrections.

Each skeletal segment may be thought of as having its own coordinate system, and corrections to the envelope should be made in this coordinate system since it provides a convenient baseline. As previously discussed with reference to FIGS. 2a and 2b, primary corrective enveloping modifies the location of certain control points to ensure that there is no breaking or overlapping of the envelope when two adjacent segments are moved relative to one another. FIG. 8a is an exploded illustration of the joint illustrated in FIGS. 2a and 2b. The control point 42 on segment 10 and the control point 40 on segment 14 both move to the point 44 according to the primary enveloping process. If an animator makes a correction to the primary envelope so that the control point 44 (actually representing both control points 40 and 42) is moved to point 46, some coordinate system must be chosen to compare this correction against corrections for other poses, for example a pose illustrated in FIG. 8b, where the position of the two segments results in a different primary envelope.

The rest position, as illustrated in FIG. 4, which is the natural coordinate system of a segment, is used as the coordinate system in which the changes are stored and against which future changes are measured. Thus, the correction made by an animator as illustrated in FIG. 8a corresponds to a correction in the natural coordinate system of the segments 10 and 14 as illustrated by the distances 50 and 52. To convert the primary envelope coordinates to the rest position coordinates, the inverse of the function that translates the rest position coordinates to the primary envelope coordinates is used. The inverse of this function translates from the primary envelope coordinates to the rest position coordinates. The database stores secondary corrections to the envelope in the rest position coordinates.

In particular, the database stores both the description of the pose, that is, angles between segments, and the corrected geometry expressed as:

$$VCc = (MPsc^{-1} \cdot VMc) - VR, \text{ with:}$$

VCc: difference vector between the corrected vertex for correction c and the rest vertex (the corrected vertex is the inverse transform of VMc into the coordinate system of each segment s influencing VMc, i.e., for which WPs≠0, where WPs is the primary enveloping weight for segment s.).

$MPsc^{-1}$: inverse transformation matrix (posed→rest) for segment s at pose c.

VMc: corrected vertex for correction c.

VR: XYZ coordinates of a point of the rest geometry, expressed in a segment coordinate system.

As previously described, the weighting of the influence of the previously stored poses is determined as illustrated in FIG. 7 and the weights are multiplied by the difference from the rest position to derive a correction. FIG. 9a illustrates the rest position of an envelope for a particular skeletal segment, with control points 60, 62, 64, 66, 68 and 70 shown as dots, in one dimension for an object's envelope with two previously entered second order corrections 72 and 74 in that dimension for two other poses. These corrections are weighted and added together as illustrated in FIG. 9b. The corrections are performed for the three cartesian dimensions for each control point on the surface.

The adjusted control point values are in the coordinates of the rest position and thus must be translated to a correction for the new pose. This is done by simply applying the translation formula from the rest position to the primary envelope position. Specifically, a vertex of the final enveloped surface is derived from:

$$V = \Sigma_s WPs \cdot MPs \cdot (WC0 \cdot VR + \Sigma_{c>0}(WCc \cdot VCc)),$$

with:

WCc: user defined corrective weight function of the "Euclidean" distance (in pose space) from interpolated pose P to pose Pc. (WCO is the corrective weight function for the rest pose.) This distance is currently defined by:

$$\sqrt{\sum_i (P_i - P_{ci})^2}$$

VCc: difference vector between the corrected vertex for correction c and the rest vertex.

VR: XYZ coordinates of the vertex in the rest geometry, expressed in a segment coordinate system.

WPs: primary enveloping weight for segment s.

MPs: rest to posed transformation matrix for segment s. This sum is taken only over those segments s that influence the vertex V, which are those segments for which WPs, which is the user defined primary enveloping weight for a segment s for the vertex V, is not equal to zero.

The animator now has an automatically generated second order correction that is based upon previous second order corrections. The animator may further adjust the second order corrections as desired. When satisfied, the animator may save the second order correction, which will then be stored in the database.

Flow Chart

FIG. 10 is a flow diagram depicting a preferred methodology, as previously described, in accordance with the present invention. At step 200, an animator defines a rest pose for an object defined by a skeleton. At step 210, the animator defines the primary enveloping weights. At step 215, the animator defines the influence function that determines the weighting of a secondary correction for a particular pose based upon its distance from the new pose. At step 220, the animator moves the skeleton over a number of frames to create an animated sequence. At step 230, for each frame, the software automatically generates and displays the objects' primary corrections, and if there are appropriate entries in the database, the objects' secondary corrections according to the formula:

$$V = \Sigma_s WPs \cdot MPs \cdot (WC0 \cdot VR + \Sigma_{c>0}(WCc \cdot VCc)),$$

with:

WCc: user defined corrective weight function of the "euclidian" distance (in pose space) from interpolated pose P to pose Pc. This distance is currently defined by:

$$\sqrt{\sum_i (P_i - P_{ci})^2}$$

VCc: difference vector between the corrected vertex for correction c and the rest vertex.

VR: XYZ coordinates of the vertex in the rest geometry, expressed in a segment coordinate system.

WPs: primary enveloping weight for segment s.

MPs: rest to posed transformation Matrix for segment s.

If the animator is satisfied with the automatically generated images in the sequence, then the CG software 130 branches from block 240 to 250. If the animator wants to alter a frame, block 240 branches to block 260, where the animator makes the desired changes and depresses a key to save the changes, which are then stored as:

$$VCc = (MPsc^{-1} \cdot VMc) - VR, \text{ with:}$$

VCc: difference vector between the corrected vertex for correction c and the rest vertex (the corrected vertex is the inverse transform of VMc into the coordinate system of each segment s influencing VMc, i.e., for which WPs≠0, where WPs is the primary enveloping weight for segment s.).

$MPsc^{-1}$: inverse transformation matrix (posed->rest) for segment s at pose c.

VMc: corrected vertex for correction c.

VR: XYZ coordinates of a point of the rest geometry, expressed in a segment coordinate system.

Block 260 then branches to block 230, which automatically regenerates and displays the animated sequence. The animator may make further corrections or proceed to the next sequence.

Other Variations

Detailed illustrations and preferred embodiments of computer graphics methods and apparatus in accordance with the present invention have been provided above for the edification of those of ordinary skill in the art, and not as a limitation on the scope of the invention. Numerous variations and modifications within the spirit of the present invention will of course occur to those of ordinary skill in the art in view of the preferred embodiments that have been disclosed herein. Such variations, as well as any other systems embodying any of the following claims, all remain within the scope of the present invention:

I claim:

1. A method for generating an image of a configuration P of an object, said method comprising the steps of:

generating a model of said object, said model comprising data defining a surface of said object;

computing weighted averages of manual corrections made by a user to said data defining a surface in connection with other configurations of said object, said step of computing weighted averages comprising the step of computing, for a manual correction c which was made in connection with a configuration Pc of said object, a weight based at least in part on the similarity between configuration Pc and configuration P;

generating new values for at least some of said data defining a surface based at least in part on said weighted averages; and generating an image of configuration P based at least in part on said new values for at least some of said data defining a surface;

said model of said object further comprises a skeleton, the position of said skeleton varies according to the configuration of said object;

the similarity between the position of said skeleton in configuration Pc and the position of said skeleton in configuration P is computed by means of a method comprising the following steps:

identifying a rest position of said skeleton, determining a first transformation which transforms said rest position of said skeleton to the position of said skeleton in configuration Pc, determining a second transformation which transforms said rest position of said skeleton to the position of said skeleton in configuration P, and determining the similarity between said first and second transformations.

2. The method of claim 1, where said skeleton comprises segments, said first transformation comprises for each segment s in said skeleton a first rotation which transforms the position of segment s in said rest position of said skeleton to the position of segment s in the position of said skeleton in configuration Pc, said second transformation comprises for each segment s in said skeleton a second rotation which transforms the position of segment s in said rest position of said skeleton to the position of segment s in the position of said skeleton in configuration P, and said step of determining the similarity between said first and second transformations comprises the step of determining a distance between said first rotations for all segments s in said skeleton and said second rotations for all segments s in said skeleton.

3. The method of claim 2, where said step of determining a distance comprises the steps of:

for each segment i in said skeleton, expressing said first rotation as a first vector $P_{ci}$ and expressing said second rotation as a second vector $P_i$, and computing the Euclidean distance $$\sqrt{(\Sigma_i (P_{ci} - P_i)^2)},$$

the sum being taken over all segments i in said skeleton.

4. A method for generating an image of a configuration P of an object, said method comprising the steps of generating a model of said object, said model comprising data defining a surface of said object;

computing weighted averages of manual corrections made by a user to said data defining a surface in connection with other configurations of said object, said step of computing weighted averages comprising the step of computing, for a manual correction c which was made in connection with a configuration Pc of said object, a weight based at least in part on the similarity between configuration Pc and configuration P;

generating new values for at least some of said data defining a surface based at least in part on said weighted averages; and generating an image of configuration P based at least in part on said new values for at least some of said data defining a surface;

said model of said object further comprises a skeleton, the position of said skeleton varies according to the configuration of said object;

the similarity between configuration Pc and configuration P is computed based at least in part on the similarity between the position of said skeleton in configuration Pc and the position of said skeleton in configuration P;

the data defining a surface of said object comprises control points, where said manual corrections comprise new positions for control points, and where said step of computing weighted averages comprises the step of computing weighted averages of new positions for control points pertaining to said manual corrections;

said step of computing weighted averages of new positions for control points comprises the steps of:

identifying a rest configuration P0 for said object, for each control point v in a set of control points and for each manual correction c comprising a new position for control point v, transforming said new position for control point v to a corresponding position for control point v in said rest configuration P0, computing weighted average positions based at least in part on corresponding positions computed in the preceding step, and transforming said weighted average positions computed in the preceding step to corresponding positions in configuration P.

5. The method of claim 4, where said skeleton comprises segments, each control point pertains to one or more segments, said method further comprises the step of identifying a rest position for said skeleton corresponding to said rest configuration P0, and said step of transforming said new position for control point v and manual correction c comprises the step, executed for each segment s to which control point v pertains, of applying to said new position for control point v the inverse of a transformation which transforms segment s from said rest position of said skeleton into a position of said skeleton corresponding to a configuration Pc of said object, said manual correction c having been made in connection with configuration Pc.

6. The method of claim 5, where said step of applying to said new position for control point v the inverse of a transformation comprises the step of computing the vector $VCsc = (MPsc^{-1} \cdot VMc) - VR$, where:

$MPsc^{-1}$ comprises the inverse of a matrix representing a transformation which transforms the position which segment s occupies in said rest position of said skeleton to the position which segment s occupies in said position of said skeleton corresponding to configuration Pc;

VMc comprises said new position for control point v, expressed as a vector; and

VR comprises a position for control point v in said rest configuration P0, expressed as a vector.

7. The method of claim 6, where said step of computing weighted average positions comprises the step of computing $Vs = \Sigma_{c>0}(WCc \cdot VCsc)$, where s comprises a segment forming part of said skeleton, c comprises a manual correction, where correction c comprises a new position for control point v, and where correction c was made in connection with a configuration Pc of said object, and WCc comprises a weight for correction c based at least in part the similarity between configuration Pc and configuration P.

8. The method of claim 7, where said step of transforming said weighted average positions comprises the step of computing $$V = \Sigma_s WPs \cdot MPs \cdot (WC0 \cdot VR + Vs),$$

where:

s comprises a segment forming part of said skeleton,

VR comprises a vector representing a position of control point v in said rest configuration P0, WC0 comprises a weight for said rest configuration P0, WPs comprises a primary enveloping weight for segment s, and MPs comprises a matrix representing a transformation which takes segment s from the position which segment s occupies in said rest configuration P0 to the position which segment s occupies in configuration P.

* * * * *

UNITED STATES PATENT AND TRADEMARK OFFICE
CERTIFICATE OF CORRECTION

PATENT NO. : 5,883,638
DATED : March 16, 1999
INVENTOR(S) : Rouet, et. al.

It is certified that error appears in the above-identified patent and that said Letters Patent is hereby corrected as shown below:

Title page, item [75], inventor's address "Paloi" should read -- Palo--.

Signed and Sealed this

Twenty-fourth Day of October, 2000

Attest:

Q. TODD DICKINSON

*Attesting Officer*  *Director of Patents and Trademarks*